United States Patent [19]

Batzer et al.

[11] B 3,997,511

[45] Dec. 14, 1976

[54] UNSATURATED LINEAR POLYESTERS

[75] Inventors: Hans Batzer, Arlesheim; Jurgen Habermeier, Pfeffingen, both of Switzerland

[73] Assignee: Ciba-Geigy Corporation, Ardsley, N.Y.

[22] Filed: Nov. 5, 1974

[21] Appl. No.: 521,128

[44] Published under the second Trial Voluntary Protest Program on February 10, 1976 as document No. B 521,128.

[30] Foreign Application Priority Data

Nov. 13, 1973  Switzerland ............ 15954/73
Aug. 6, 1974  Switzerland ............ 10736/74

[52] U.S. Cl. .................... 260/75 N; 260/75 H; 260/75 UA; 260/DIG. 24
[51] Int. Cl.² .................................. C08G 63/68
[58] Field of Search .......... 260/75 N, 75 H, 75 UA, 260/DIG. 24

[56] References Cited

UNITED STATES PATENTS

| 3,763,269 | 10/1973 | Formaini | 260/75 UA |
| 3,860,564 | 1/1975 | Habermeier et al. | 260/75 N |

*Primary Examiner*—Theodore Morris
*Assistant Examiner*—W. C. Danison, Jr.
*Attorney, Agent, or Firm*—Luther A. R. Hall

[57] ABSTRACT

Unsaturated, linear polyesters having flame-retarding properties are obtained by polycondensing unsaturated dicarboxylic acids, optionally mixed with aromatic dicarboxylic acids and aliphatic diols, with brominated and/or chlorinated 1,3-di-(hydroxyalkyl)-benzimidazolone compounds. The new, unsaturated polyesters can be polymerized easily, also when mixed with other polymerizable monomers, and give moulding materials having flame-retarding properties.

4 Claims, No Drawings

UNSATURATED LINEAR POLYESTERS

The present invention relates to new, unsaturated, linear polyesters which are based on unsaturated dicarboxylic acids and contain chlorinated or brominated di-(hydroxyalkyl)benzimidazolones as the diol component, a process for the manufacture of the new polyesters, and the use of these polyesters, optionally when mixed with olefinically unsaturated monomers, for the manufacture of polymers or copolymers which are not readily combustible.

Unsaturated polymers based on unsaturated dicarboxylic acids, such as maleic acid and/or fumaric acid, and their use for the manufacture of polymers and copolymers, are known.

It is further known to impart flame-retarding properties to these resins by modification with halogen-containing compounds. The use of non-reactive halogen compounds, for example chloroparaffins, in polyester resins has the disadvantage that resins having poor stability to light are obtained and a plasticising effect occurs, which is often not desired. In addition, nonreactive halogen compounds tend to migrate out of the resin, so that, in addition to the loss of the flame-retarding effect, problems of a toxicological nature can also occur.

A change has been made to imparting flame-retarding properties to the polyesters by incorporating reactive halogen compounds into the polyester molecule. In this respect, 3,4,5,6,7,7-hexachloro-3,6-endomethylene-1,2,3,6-tetrahydrophthalic acid (also called HET acid) and its anhydride, which are obtained by Diels-Alder addition of hexachlorocyclopentadiene to maleic acid or the anhydride thereof, have achieved great industrial importance amongst the halogen-containing compounds. The use of these Diels-Alder adducts for the manufacture of polyesters which are not readily combustible is described in US Patent 2,779,701. In addition to their flame-retarding property, these polyesters are also distinguished by good stability to light and resistance to weathering, but display the disadvantage that they are insufficiently heat-stable at elevated temperature, which is probably attributable to the reverse Diels-Alder reaction which sets in at elevated temperatures.

It has now been found that unsaturated polyesters which have flame-retarding properties and which exhibit the abovementioned disadvantages to a greatly reduced extent, are obtained if chlorinated and/or brominated di-(hydroxyalkyl)-benzimidazolones are co-condensed into the polyester molecule as the diol component.

The polyesters according to the invention, which, in respect of their flame-retarding properties, are at least equivalent when compared with the polyesters modified by means of HET acid, are distinguished, on the one hand, by better processability, and, on the other hand, by the fact that the crosslinked products obtained by polymerisation curing have better mechanical and dielectric properties, particularly better heat-stability.

In the following text, polyesters are understood as all polymers which are built up from both an acid component and several acid components and a diol component or several diol components.

The present invention therefore relates to unsaturated, linear polyesters, the acid component of which consists, to the extent of at least 20 mol%, preferably at least 50 mol%, relative to the total amount of dicarboxylic acid radicals, of unsaturated dicarboxylic acid radicals, and which are characterised in that they contain, as the flame-retarding component, diol radicals of the formula I

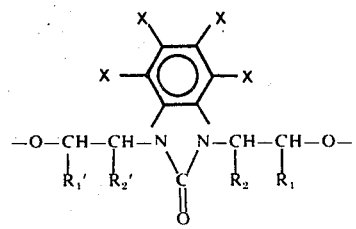

(I)

wherein X denotes bromine and/or chlorine atoms, $R_1$ and $R'_1$ independently of one another each denote a hydrogen atom or the methyl, ethyl, or phenyl group, and $R_2$ and $R'_2$ independently of one another each denote a hydrogen atom or each, conjointly with $R_1$ or $R'_1$, denote the trimethylene or tetramethylene radical.

The new polyesters preferably consist of radicals of maleic acid or fumaric acid and up to 50 mol%, relative to the total amount of dicarboxylic acid radicals, of aromatic dicarboxylic acid radicals containing a benzene ring and/or of aliphatic dicarboxylic acid radicals containing 4 to 10 carbon atoms, of diol radicals of aliphatic diols containing 2 to 24 carbon atoms, it being possible for the aliphatic hydrocarbon chain also to contain ether oxygen atoms, and of diol radicals of the formula I wherein X denotes bromine or chlorine atoms, $R_1$ and $R'_1$ each denote a hydrogen atom or the methyl group, and $R_2$ and $R'_2$ each denote a hydrogen atom.

The polyesters according to the invention preferably contain only maleic acid and/or fumaric acid as the unsaturated dicarboxylic acid component. Other unsaturated dicarboxylic acids which can be used are itaconic, citraconic and dimethylmaleic acid and these are preferably admixed with the maleic or fumaric acid. The polyesters according to the invention can also contain up to 80 mol%, preferably up to 50 mol%, relative to the total amount of dicarboxylic acid, of aromatic dicarboxylic acids, such as phthalic acid, terephthalic acid or isophthalic acid, preferably phthalic acid, and/or aliphatic dicarboxylic acids, such as succinic acid, glutaric acid, adipic acid, pimelic acid, suberic acid, azelaic acid and sebacic acid, preferably adipic acid, glutaric acid or sebacic acid, and also stable, halogenated derivatives thereof, for example 2,5-dibromoterephthalic acid.

The polyesters according to the invention preferably contain ethylene glycol, diethylene glycol, polyethylene glycols containing up to 24 C atoms, propylene glycol, dipropylene glycol, polypropylene glycols containing up to 24 C atoms, butanediol or neopentyl glycol, especially ethylene glycol or diethylene glycol, co-condensed as the aliphatic diols.

In order to obtain polyester resin compositions having special properties, the polyesters according to the invention can also contain small proportions of co-condensed, unsaturated, aliphatic diols or cycloaliphatic diols, such as cyclohexane1,4-diol, as well as the additives, such as tetrahydrofurfuryl alcohol, which are customary for polyester resins.

In order that the polyesters according to the invention may exhibit an adequate flame-retarding property, the proportion of the chlorine-containing or bromine-containing diol component of the formula I must, in the absence of synergists, be so regulated that the polyester resin has a chlorine content of at least 20 per cent by weight and a bromine content of at least 15 per cent by weight. The polyester resins according to the invention preferably contain 20 to 30 per cent by weight of chlorine and 20 to 50 per cent by weight of bromine.

In the absence of synergists, for example phosphorus and antimony compounds, it is possible to increase the flameproofing property of the polyester resins or to reduce, correspondingly, the proportion of diols of the formula I.

The unsaturated, new polyesters are obtained by known processes by polycondensing, in a known manner, up to an acid number of less than 100, dicarboxylic acids consisting, to the extent of at least 20 mol%, preferably to the extent of at least 50 mol% relative to the total amount of dicarboxylic acids, of unsaturated dicarboxylic acids, or polyester-forming derivatives thereof, with diols of the formula II (II)

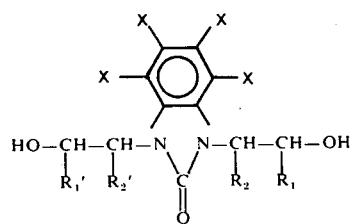

wherein X, $R_1$, $R'_1$, $R_2$ and $R'_2$ have the same meaning as in formula I, optionally mixed with aliphatic diols.

Preferably, maleic acid and/or fumaric acid, mixed with up to 50 mol%, relative to the total amount of dicarboxylic acids, of aromatic dicarboxylic acids containing a benzene ring, and/or of aliphatic dicarboxylic acids containing 4 to 10 carbon atoms, are polycondensed, up an acid number of 5–50, with diols of the formula II wherein X denotes bromine or chlorine atoms, $R_1$ and $R'_1$ each denote a hydrogen atom or the methyl group, and $R_2$ and $R'_2$ each denote a hydrogen atom, mixed with aliphatic diols containing 2 to 24 carbon atoms, it being possible for the aliphatic hydrocarbon chain also to contain ether oxygen atoms.

The acid number is understood, as is known, as the amount of KOH in mg which is required to neutralise the free carboxyl groups contained in 1 g of polyester.

Examples of known processes for the preparation of the new polyesters are solution condensation or azeotropic condensation, or interface, melt or solid phase condensation and a combination of these methods, depending on which polyesterforming derivatives are used. The polycondensation is preferably carried out without the use of solvents.

The anhydrides of the unsaturated dicarboxylic acids and of phthalic acid and succinic acid are mainly used as the polyester-forming derivatives. Furthermore, the polyanhydrides of terephthalic acid or isophthalic acid are also suitable. Dialkyl esters containing 1 to 4 carbon atoms in the alkyl radical, preferably dimethyl esters, or diphenyl esters, of the dicarboxylic acids can also be used as polyester-forming derivatives.

The diols of the formula II are new compounds and are obtained by reacting diols of the formula III (III)

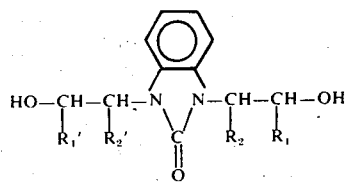

wherein $R_1$, $R'_1$, $R_2$ and $R'_2$ have the same meaning as in formula I, with 4 mols of bromine and/or chlorine. This conversion reaction proceeds partically quantitatively in the absence of catalysts, if it is carried out in water and in the temperature range of 40°–100°C, preferably 80°–100°C. A slight molar excess of halogen is preferably used. When preparing definite diols of the formula II which contain bromine and chlorine, the bromination and chlorination are carried out successively.

The diols of the formula III are obtained analogously to the process described in U.S. Pat. No. 3,629,263 by an addition reaction of 2 mols of alkylene oxide, such as ethylene oxide, propylene oxide, butylene oxide, styrene oxide, cyclopentene oxide or cyclohexene oxide, preferably in the presence of a catalyst, with 1 mol benzimidazolone.

The new polyesters can be prepared by esterifying or trans-esterifying unsaturated dicarboxylic acids, optionally mixed with terephthalic acid, isophthalic acid or low molecular dialkyl esters thereof, with the diols of the formula II, preferably mixed with aliphatic diols, in an inert atmosphere, for example a nitrogen atmosphere, with simultaneous removal of the water or alkanol formed, at 100°–250°C, and subsequently carrying out the polycondensation at 150°–270°C under reduced pressure until the polycondensates have the desired acid number.

When preparing polyesters which, in addition to a diol to be used in accordance with the invention, also contain an aliphatic diol component, it is advantageous to use this diol component in an excess, so that, after the esterification or trans-esterification, essentially monomeric diglycol esters of both diols are obtained and these are then polycondensed in vacuo while removing the excess aliphatic diol by distillation.

In order to prevent premature polymerisation, the polyester resin compositions can contain known polymerisation inhibitors, usually in an amount of 0.001 to 1 per cent by weight. Examples of possible inhibitors of this kind are compounds such as hydroquinone, benzoquinone, phenothiazine, Cu salts and the like.

Depending on their composition and molecular weight, the new, unsaturated polyesters are liquid-viscous to solid, glassy polymers, the colour of which can be from colourless to yellowish. These polyesters can be polymerised easily. The new polyesters are preferably polymerised mixed with other polymerisable monomers. The ratio between the unsaturated polyester and the polymerisable monomers can vary within wide limits, but is dependent on the bromine or chlorine content of the unsaturated polyester, in order that copolymers having flameretarding properties may be obtained. When using a polyester containing approx. 40 per cent by weight of bromine, the former can, for example, be mixed with equal parts of styrene. As a rule, the proportion of polymerisable monomers in the curable mixture is 10 to 60% relative to the total amount of the mixture. For some applications the polyesters according to the invention are also used without additional monomers.

Suitable monomers which can be added to the unsaturated polyesters are above all olefinically unsaturated monomers containing one or more vinyl or allyl radicals. The following may be mentioned as examples: styrene, divinylbenzene, vinyl acetate, diallyl phthalate, diglycollic acid diallyl ester, diethylene glycol-bis-allyl carbonate, diallylphenol phosphate, triallyl cyanurate and compounds of the acrylic acid series, such as esters of acrylic acid or methyacrylic acid alcohols or phenols, for example methyl acrylate, ethyl acrylate, butyl acrylate, dodecyl acrylate, methyl methacrylate; acrylonitrile, methacrylonitrile and ethylene glycol dimethacrylate.

The present invention therefore also relates to curable mixtures which are suitable for the production of shaped articles including sheet-like structures and which contain (a) the unsaturated polyesters according to the invention, (b) copolymerisable monomers and (c) the polymerisation catalysts which are customary for polymerisation curing.

The customary catalysts which form free radicals are preferably used for the polymerisation or copolymerisation; mention may be made of hydrazine derivatives, for example hydrazine hydrochloride, organo-metallic compounds, such as tetraethyl-lead, and, particularly, aliphatic azo compounds, such as $\alpha,\alpha'$-azoisbutyrodinitrile, and organic peroxides or per-salts, such as, for example, peracetic acid, acetyl peroxide, chloroacetyl peroxide, trichloroacetyl peroxide, benzoyl peroxide, tert.-butyl perbenzoate, chlorobenzoyl peroxide, benzoylacetyl peroxide, propionyl peroxide, fluorochloropropionyl peroxide, lauroyl peroxide, cumene hydroperoxide, cyclohexanone hydroperoxide, tert.-butyl hydroperoxide, di-tert.butyl peroxide, di-tert.-amyl peroxide, p-menthane hydroperoxide; and also inorganic peroxide compounds, such as sodium peroxide, alkali metal percarbonates, alkali metal persulphates or alkali metal perborates and, particularly, hydrogen peroxide, which can with advantage replace the more expensive benzoyl peroxide. Their addition is regulated in a known manner according to the desired progress of the reaction or the desired properties of the polymer; it is advantageous to employ about 0.05 to 2 per cent by weight of the catalyst, calculated on the total weight of polyester mixture or polyester-monomer mixture, the total quantity of the catalyst being added either at the beginning of the polymerisation or in portions during the progress of the polymerisation.

In certain cases cationic or anionic catalysts can also be used. The polymerisation reaction can also be carried out, with or without special additives, by means of radiation rich in energy, such as UV light, $\gamma$-radiation or electron radiation.

The new polyesters manufactured in accordance with the invention, or mixtures thereof with other polymerisable monomers, can be used in the protection of surfaces, in moulding compositions and as casting resins, laminating resins, lacquer resins, powder resins and the like.

The polymerisable mixtures which are suitable for the production of coatings and moulding compositions can additionally contain plasticisers and inert additives of all kinds, such as, for example, fillers, reinforcing materials, especially glass fibres, inorganic or organic pigments, optical brighteners and delustering agents.

PREPARATION OF THE CHLORINATED OR BROMINATED DI-(HYDROXYALKYL)BENZIMIDAZOLONES

EXAMPLE A:

1,3-Di-(2-hydroxyethyl)-4,5,6,7-tetrabromobenzimidazolone 333.3 g of 1,3-di-(2-hydroxyethyl)-benzimidazolone (1.5 mols) are stirred in a reaction flask with 3.5 litres of water at 90°C until a clear solution is formed. 1,198 g of bromine (7.5 mols) are then added dropwise with gentle stirring over the course of 30 minutes. A yellowish precipitate settles out at once. After the dropwise addition, the reaction mixture is stirred more vigorously for a further 4 –5 hours, in order to achieve more thorough mixing, and the internal temperature is raised to 92°–96°C.

The hydrogen bromide formed in the reaction and the excess bromine vapours are fixed by means of 5% strength sodium hydroxide solution in a washing tower filled with active charcoal.

The reaction mixture is subsequently cooled to 5°–10°C and the product is isolated by filtration with suction. It is purified by being stirred with 5 litres of water and is again filtered off under strong suction. After being sucked dry, the product is dried in a vacuum cabinet at 100°C.

778.5 g (96.6% of the theoretic yield) of a practically colourless product melting at 266.2°C (Mettler "FP 51", heating rate 1°C/minutes) are obtained.

35 g of the crude product are purified by recrystallisation from 150 ml of ethylene glycol. After drying at 150°C, pure white needles melting at 267.5°C are obtained.

The elementary analysis (for $C_{11}H_{10}Br_4N_2O_3$) gives:

| Found | Calculated |
|---|---|
| 24.76% C | 24.57% C |
| 1.92% H | 1.87% H |
| 5.21% N | 5.21% N |
| 59.45% Br | 59.43% Br. |

The H-NMR spectrum and the mass spectrum are in agreement with the following formula:

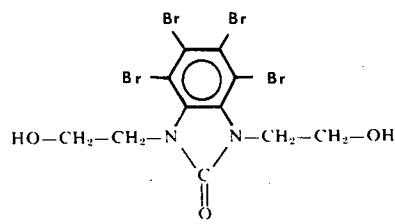

EXAMPLE B:

1,3-Di-(2-hydroxyethyl)-4,5,6,7-tetrachlorobenzimidazolone 222.2 g of the starting material used in Example a are dissolved in 2 litres of water at 90°C. 425.4 g of chlorine gas (13.4 litres) are passed into this clear solution at 90°–100°C over the course of 6 hours. The chlorine flow is checked by means of a rotameter flowmeter. A device for equalising the pressure is interposed between the chlorine cylinder and the rotameter. The stream of hydrogen chloride set free in the reaction is once more absorbed in a column charged with active charcoal through which 10% strength sodium hydroxide solution circulates.

The product begins to precipitate after about 1.5 hours of passing in chlorine gas. After the completion of passing in chlorine gas, a thick, colourless mash is formed. The reaction mixture is worked up as described in Example a.

333.5 g (92.6% of theoretical yield) of the crude tetrachloro compound are obtained in the form of colourless crystals of melting point 237.8°C.

The product can with advantage by recrystallised from a dioxane-ethylene glycol solvent mixture (mixing ratio 1:1). This gives colourless, fine, crystalline needles melting at 240.1°C.

Micro-analysis ($C_{11}H_{10}Cl_4N_2O_3$) gives:

| Found | Calculated |
|---|---|
| 36.65% C | 36.69% C |
| 2.76% H | 2.76% H |
| 7.99% N | 7.78% N |
| 39.20% Cl | 39.39% Cl. |

The H-NMR spectrum is in agreement with the following structural formula:

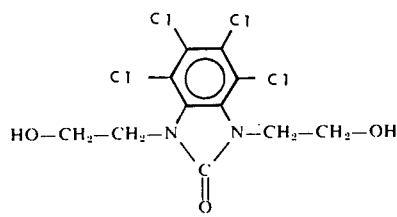

EXAMPLE C:

1,3-Di-(2-hydroxy-n-propyl)-4,5,6,7-tetrachlorobenzimidazolone 250.3 g of 1,3-di-(2-hydroxy-n-propyl)-benzimidazolone (1.0 mol) are reacted, in 2 litres of water at 95°–100°C, with 425.4 g of chlorine according to the procedure described in Example b.

By maintaining the reaction conditions quoted there, a flocculated crystalline mass is obtained on the completion of the reaction. After cooling and decanting off supernatant water, it is dissolved in 500 ml of dioxane and is precipitated from 7 litres of cold water. This gives colourless, fine crystals (367.2 g. corresponding to 94.6% of the theoretical yield) with a melting point of 138.8°C. A sample recrystallised from acetone melts at 158°C. The H-NMR spectrum is in agreement with the structure set out below.

Elementary analysis ($C_{13}H_{14}Cl_4N_2O_3$) gives:

| Found | Calculated |
|---|---|
| 39.85% C | 40.23% C |
| 3.63% H | 3.63% H |
| 7.20% N | 7.22% N |
| 36.25% Cl | 36.54% Cl. |

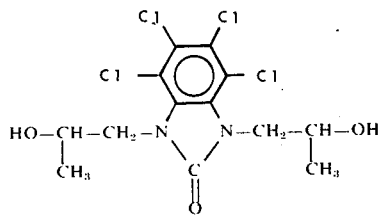

PREPARATION OF THE POLYESTERS

EXAMPLE 1:

Bromine-containing, unsaturated polyester containing approx. 40% of bromine (undiluted)

A mixture of 171.5 g of maleic anhydride (1.75 mols), 55.5 g of phthalic anhydride (0.375 mol) and 54.5 g of adipic acid (0.375 mol) is heated to 80°C under a stream of nitrogen in a laboratory glass apparatus equipped with a stirrer, a thermometer, a condenser and receiver for downward distillation and nitrogen inlet, and a mixture of 672.3 g of 1,3-di-(2-hydroxyethyl)-4,5,6,7-tetrabromobenzimidazolone (1.25 mols), 146.0 g of diethylene glycol (1.375 mols) and 15.4 g of ethylene glycol (0.25 mol) is added. This mixture is heated to 150°C under nitrogen over the course of 1 hour. The temperature is then raised uniformly over the course of 6 hours, with continual stirring, to 210°C. After heating for 4 hours at 210°C, a sample indicates an acid number of 122. After heating for a further 3 hours, the acid number has fallen to 12. The reaction mass is cooled to 180°C, 200 mg of hydroquinone are added and the whole is poured out onto a metal sheet to cool. A product which is solid at room temperature is obtained in a quantitative yield, having an acid number of 11.0 and a softening point (Kofler) of 62°–64°C.

The new, unsaturated polyester thus obtained contains 37.4 per cent by weight of stable bromine (calculated 38.61% of Br).

On heating gently, the new, unsaturated polyester readily dissolves in styrene in the most diverse mixing ratios, for example:

1 a. A soultion of 100 parts by weight of the polyester obtained above in 50 parts of styrene:
Density of the solution : 1.399 g/ml (at 20°C) Viscosity: 644 cP (at 30°C) Bromine content: 25.7 per cent by weight.

1 b. A solution of 150 parts of the polyester described above in 50 parts of styrene. Bromine content: 28.9 per cent by weight.

1 c. A solution of 100 parts of the polyester in 100 parts of styrene. Bromine content: 19.3 per cent by weight.

Solutions 1 (a), 1 (b) and 1 (c) are stable for a period of several weeks at temperatures between 5° and 25°C.

EXAMPLE 2:

Unsaturated, bromine-containing copolyester containing approx. 25% of bromine (undiluted)

A mixture of: 85.75 g of maleic anhydride (0.875 mol), 27.75 g of phthalic anhydride (0.1875 mol), 27.25 g of adipic acid (0.1875 mol), 73.00 g of diethylene glycol (0.688 mol), 168.1 g of 1,3-di-(2-hydroxyethyl)-4,5,6,7-tetrabromobenzimidazolone (0.3125 mol) and 43.12 g of ethylene glycol (0.70 mol) is condensed in an apparatus according to Example 1.

The reaction mixture is heated to 160°C over the course of 1 hour, under nitrogen, and the pale yellow suspension is then brought up to 210°C over the course of 6 hours with stirring and is subsequently allowed to react at 210°–220°C for 4 hours. After this the acid number of a sample is 184.

The reaction product is cooled to 180°C and condensation is continued at 180°C under a waterpump vacuum of about 25 –30 mm Hg. After 90 minutes the acid number of the product has fallen to 5 –7. 200 mg of hydroquinone are added to the product and the resin is mixed, whilst still warm, with styrene in the weight ratio resin/styrene = 100/43.

The solution thus obtained contains 17.9 per cent by weight of stable bromine (calculated 18.02% of Br). It has a density of 1.28 g/ml at 20°C and a viscosity of 178 cP at 30°C.

EXAMPLE 3:

Chlorine-containing, unsaturated polyester containing approx. 28% of chlorine (undiluted).

The following mixture is condensed analogously to Example 2 in accordance with the conditions described in Example 2: 49.0 g of maleic anhydride (0.5 mol), 7.3 g of adipic acid (0.05 mol), 144.0 g of 1,3-di-(2-hydroxyethyl)-4,5,6,7-tetrachloro-benzimidazolone (0.4 mol), 4.9 g of ethylene glycol (0.08 mol) and 10.6 g of diethylene glycol (0.1 mol).

150 mg of hydroquinone are used as inhibitor. The unsaturated copolyester (having 27.9% of stable chlorine) obtained in a quantitative yield, is mixed with styrene in the weight ratio resin/styrene = 100/30. This solution, which is a liquid of medium viscosity, contains 21.1 per cent by weight of stable chlorine (calculated: 21.4%).

Comparison Example A (according to the instructions of SorensonCampbell in "Praeparative Methoden der Polymeren-chemie"("Preparative Methods Sorenson-Campbell Polymer Chemistry") (1962)).

The following mixture is polycondensed, as described by Sorenson-Campbell on page 277 in Experiment 252: 85 g of ethylene glycol (1.38 mols), 146 g of diethylene glycol (1.38 mols), 171.5 g of maleic anhydride (1.75 mols), 55.5 g of phthalic anhydride (0.375 mol) and 54.5 g of adipic acid (0.375 mol).

The acid number of the polyester thus obtained is approx. 20. It is mixed with styrene in the weight ratio polyester/styrene = 100/43. The density of this solution is 1.155 g/ml at 20°C. The viscosity of the solution is 3,400 cP at 30°C.

Comparison Example B

In a manner corresponding to Example 1 of U.S. Pat. No. 2,779,701, a mixture of 52.8 g of pure ethylene glycol (0.851 mol), 90.0 g of diethylene glycol (0.848 mol) and 394.5 g (1.015 mols) of 3,4,5,6,7,7-hexachloro-3,6-endomethylene-1,2,3,6-tetrahydrophthalic acid, together with 70.8 g of maleic anhydride, is brought up to 160°–170°C over the course of 2 hours whilst passing nitrogen over it and stirring uniformly. In the course thereof, water begins to distil off. The reaction mixture is condensed until the acid number of the reaction product has reached approx. 56 (total time approx. 6 hours), 3.6 g of tetrahydrofurfuryl alcohol (0.035 mol) are then added, followed by 0.1 g of hydroquinone, and the reaction product is further condensed until it has an acid number of approx. 45, a further 1.5 hours being needed for this. The condensation product is poured out onto a metal sheet in order to cool (whilst cooling with nitrogen gas). The resulting clear resin (542 g) softens below 100°C (beginning of softening: 67°C) and contains 38.1 per cent by weight of chlorine.

The following mixtures, which are more or less highly viscous at room temperature, are prepared from this resin by mixing with styrene whilst stirring and warming gently.

Comparison Polyester Solution B₁)

according to Example 29 of U.S. Pat. No. 2,779,701
100 parts of the above polyester are dissolved in 30 parts of styrene. This gives a highly viscous solution containing approx. 30% of chlorine.

Comparison Polyester Solution B₂)

100 parts of the above polyester are dissolved in 43 parts of styrene. The solution contains 26.6 per cent by weight of chlorine. (In respect to dilution, this comparison polyester solution corresponds to the polyester solution prepared in Example 2).

Comparison Polyester Solution B₃)

100 g of the above polyester are dissolved in 50 parts of styrene. This solution contains 25.1 per cent by weight of chlorine. In respect of dilution, this comparison polyester solution corresponds to the polyester solution prepared in Example 1 a).

EXAMPLE 4

Highly viscous, unsaturated polyester having a bromine content of 23%.

A mixture of 69.64 g of fumaric acid (0.6 mol), 98.06 g of maleic anhydride (1.0 mol) and 66.45 g of isophthalic acid (0.4 mol), together with 215.1 g of the diol (0.4 mol) prepared according to Example a), 31 g of ethylene glycol (0.5 mol) and 135.39 g of neopentyl glycol (1.3 mols), is heated to 150°C, the condensation beginning, with removal of water and excess glycol by distillation, whilst the mixture is stirred and nitrogen is passed in. The mixture is heated to 200°C over the course of 4 hours, a clear, colourless melt being formed. The temperature is then raised to 210°C for 2 hours, after which the condensate has an acid number of 41. The melt is then cooled to 170°C, a mixture of 3.0 g of benzyl alcohol and 0.3 g of hydroquinone is added and the mixture is stirred for a further 20 minutes at 160°C and is cooled to room temperature by being poured out onto metal sheets. The unsaturated polyester thus obtained contains 23.1% of bromine and has an acid number of 36.

EXAMPLE 5

Unsaturated polyester containing 50 mol % of a maleic acid component and 37% of bromine 1.0 mol of 99% strength maleic anhydride (99.05 g) and 1.0 mol of 94% strength sebacic acid (215.16 g), together with 1.0 mol of the diol (537.8 g) prepared according to Example a and 1.2 mols of ethylene glycol (74.5 g), are brought up to 210°C, from 150°C, over the course of 3 hours, under a nitrogen atmosphere, condensation being carried out with stirring and a clear, colourless melt being formed. The temperature is raised to 220°C and the melt is stirred for 2 hours. It is then cooled to 170°C. A sample taken from the batch then has an acid number of 28. 0.5 g of hydroquinone and 1.2 g of benzyl alcohol are added and stirring is continued for a further 30 minutes at 170°–180°C. The clear, pale yellow resin is then allowed to cool. It contains 37% of bromine. 1 part by weight of this resin is readily soluble, for example, in 0.4 part of styrene at 50°–60°C.

EXAMPLE 6

Unsaturated polyester having 38% of bromine and a small C=C content.

The following mixture is polycondensed in accordance with Example 5 as far as reaction times and temperatures are concerned: 19.8 g of maleic anhydride (0.2 mol), 29.7 g of phthalic anhydride (0.2 mol), 40.5 g of sebacic acid (0.2 mol), 58.4 g of adipic acid (0.4 mol), 268.9 g of diol according to Example a (0.5 mol), 31 g of ethylene glycol (0.5 mol) and 10.6 g of diethylene glycol (0.1 mol).

After the completion of the reaction, 0.5 g of benzyl alcohol and 0.25 g of hydroquinone are stirred in.

The polyester thus obtained has an acid number of 11, its softening point (by Kofler's method) is ~25°C and its content of C=C double bonds is 0.47 equivalent/kg (100% of theory).

EXAMPLE 7

Solid, unsaturated polyester containing 38% of bromine and a long-chain diol component A mixture of the following substances is polycondensed in exact accordance with Example 5: 99.05 g of maleic anhydride (1.0 mol), 29.37 g of adipic acid (0.2 mol), 376.46 g of diol according to Example a (0.7 mol) and 101.17 g of 1,12-dodecanediol (0.5 mol).

The resulting polycondensate is stabilised by means of 1.2 g of benzyl alcohol and 0.3 g of hydroquinone, as described in Example 5. The cooled material has the following properties:

Bromine content: 38.4%
Acid number: 21
Softening point by Kofler's method: 64°C
Content of double bonds: 1.67 equivalents/kg (97% of theory)

EXAMPLE 8

Solid, unsaturated polyester containing 29.5% of chlorine

A mixture of the following substances is polycondensed in accordance with Example 5 and is then stabilised: 19.34 g of fumaric acid (0.16 mol), 2.43 g of adipic acid (0.016 mol), 38.81 g of diol according to Example c (0.1 mol), 3.72 g of ethylene glycol (0.06 mol) and 3.53 g of diethylene glycol (0.03 mol).

A pale yellow, solid polyester having an acid number of 35 is obtained.

EXAMPLE 9

Bromine-containing, unsaturated polyester made from a polyalkylene glycol

A mixture of: 24.0 g of polyethylene glycol 600 (0.4 mol), 484.2 g of diol according to Example a (0.9 mol), 98.1 g of maleic anhydride (1.0 mol) and 49.8 g of phthalic anhydride (0.3 mol) is polycondensed in accordance with Example 5. The resulting polycondensate is treated with 1.5 g of benzyl alcohol and 0.4 g of hydroquinone are added. This gives a viscous, unsaturated polyester having an acid number of 13 and a bromine content of 33.2%.

EXAMPLE 10

Solid, unsaturated polyester containing 37% of bromine 171.5 g (1.75 mols) of maleic anhydride, 132.9 g (0.8 mol) of isophthalic acid, 146.0 g (1.375 mols) of diethylene glycol, 672.3 g (1.25 mols) of the diol prepared in accordance with Example a and 18.5 g (0.3 mol) of ethylene glycol are mixed in a glass flask of 2.5 litres capacity and are heated to 150°C under nitrogen. Stirring is then started and the temperature is raised to 210°C over the course of 6 hours. A yellowish, clear melt is formed in this way.

The temperature is then reduced to 200°C, a vacuum of 20 mm Hg is applied and, after 2 hours, the vacuum is released by passing in nitrogen. 0.5 g of hydroquinone are added and the polyester is poured out onto metal sheets. A yellowish, clear product is obtained in a quantitative yield, having a softening point (by Kofler's method) of 71°C, an acid number of 26 and a bromine content of 37.6%.

EXAMPLE 11

Solid, unsaturated polyester containing 47% of bromine

Working in accordance with Example 10, the following components are polycondensed: 171.5 g of maleic anhydride (1.75 mols), 55.5 g of phthalic anhydride (0.375 mol), 54.5 g of adipic acid (0.375 mol), 1,075.7 g of diol according to Example a (2.0 mols) and 90.25 g of diethylene glycol (0.85 mol).

The polycondensate is also worked up and stabilised in accordance with Example 10.

This gives 1,359 g (100% of theory) of a product which softens at 98°C (Kofler), has an acid number of 10, and contains 47% of bromine. The resulting product can be mixed with styrene.

EXAMPLE 12

Unsaturated, solid polyester containing 37% of bromine

The following substances are polycondensed in accordance with Example 10: 171.5 g of maleic anhydride (1.75 mols), 99.6 g of terephthalic acid (0.6 mol), 29.1 g of adipic acid (0.2 mol), 146.0 g of diethylene glycol (1.375 mols), 672.3 g of diol according to Example a (1.25 mols) and 18.5 g of ethylene glycol (0.3 mol).

The reaction is carried out and the product is stabilised and worked up as described in Example 10

A light-coloured product is obtained, with an acid number of 30 and a softening point (Kofler) of 50°C. The bromine content is 37.6%.

EXAMPLE 13

Solid, unsaturated polyester containing 23% of chlorine

The following mixture of substances is subjected to a polycondensation analogously to Example 10: 128.63 g of maleic anhydride (1.3125 mols), 41.6 g of phthalic acid (0.281 mol), 40.9 g of adipic acid (0.281 mol), 540 g of diol according to Example b (1.5 mols) and 67.7 g of diethylene glycol (0.637 mol).

The polycondensate is stabilised and worked up exactly as described in Example 10 and a light, clear resin is obtained which softens at 65°C (Kofler) and has an acid number of 175. The product contains 23.7% of chlorine.

EXAMPLE 14

Chlorine-containing, solid, unsaturated polyester containing 22% of chlorine

A mixture of: 128.63 g of maleic anhydride (1.3125 mols), 83.2 g of isophthalic acid (0.5625 mol), 360.2 g of diol according to Example b (1.00 mol) and 120.8 g of diethylene glycol (1.1375 mols) is polycondensed in accordance with Example 10 and is worked up in an analogous manner. This gives a light brown resin having a softening point of 63°C, an acid number of 32 and a chlorine content of 22.8%.

APPLICATION EXAMPLES

EXAMPLE I 100 g of the styrene-containing polyester prepared in accordance with Example 1 a) are homogeneously mixed with 0.4 g of 8% strength cobalt naphthenate and 1.5 g of 50% strength methyl ethyl ketone hydroperoxide (in dimethyl phthalate) are subsequently stirred in. After a brief treatment under vacuum, this homogeneous, clear mixture is cast into aluminium moulds and is cured at room temperature (23°C). The resin is virtually completely cured after only 2 hours.

The casting is removed from the mould and allowed to stand at room temperature for a further day and the following characteristics are measured:

| | |
|---|---|
| Flexural strength (according to VSM* 77,103) | = 11.07 kg/mm² |
| Deflection (according to VSM 77,103) | = 7.0 mm |
| Impact strength (according to VSM 77,105) | = 6.17 cm.kg/cm² |
| Water absorption (4 days at 20°C) | = 0.22 % |
| Dimensional stability (according to DIN** 53,461) | = 61°C |
| Inflammability (according to CTM/20a)*** | = grade 2 (burning time: 0 second) |

*VSM = Verein Schweizerischer Maschinenindustrieller
**DIN = Deutsche Industrie-Norm
***CIBA-Testing-Method/20a Description of the test according to CTM/20a:

DIN standard bar (120×15×10 mm) of the plastic to be tested, clamped horizontally, is exposed for 1 minute to the flame of a Bunsen burner running on natural gas and inclined at an angle of 45° ((burner opening 9 mm, height of flame when burner is held vertically: 10 cm), so that the 15 mm wide surface of the sample is 3 cm above the upper edge of the burner and the front surface has a horizontal distance of 1 cm from the lower edge of the burner.

Grade 0: Sample burns for 15 – 60 seconds (or longer) after removing the flame.

Grade 1: Sample burns for 1 – 14 seconds after removing the flame.

Grade 2: Sample burns for 0 second, that is to say does not ignite.

Grade 1 denotes, for example, that the bar continues to burn for not longer than 15 seconds after removing the flame. It is comparable with category 2 according to ISO/R4* 1,210 (burning time 1 – 14 seconds).

4*) ISO/R = International Standards Organisation/Recommendation

EXAMPLE II 100 g of the mixture according to Example 1 b) are processed as described in Example I. This gives glass-transparent moulded articles which have a smooth surface and possess the following properties:

| | |
|---|---|
| Flexural strength (according to VSM 77,103) | = 11.35 kg/mm² |
| Deflection (according to VSM 77,103) | = 6.2 mm |
| Water absorption (4 days at 20°C) | = 0.28 % |
| Dimensional stability (DIN 53,461) | = 57°C |
| Inflammability (CTM/20a) | = grade 1 (burning time: 1 second) |

EXAMPLE III 100 g of the styrenated polyester prepared according to Example 1 c) are processed in accordance with Example I. This gives non-inflammable moulded articles which possess the following properties:

| | | |
|---|---|---|
| Dielectric loss factor | | tan δ (50 Hz) |
| | at 23°C | = 0.0066 |
| | at 100°C | = 0.010 |
| | at 150°C | = 0.039 |
| Dielectric constant ε | at 23°C | = 3.2 |
| | at 100°C | = 3.4 |
| | at 150°C | = 3.6 |
| Specific volume resistivity | | |
| | at 23°C | = 3.5 × 10¹⁶ Ω.cm |
| | at 100°C | = 1.4 × 10¹⁵ Ω.cm |
| Flexural strength (according to VSM 77,103) | | = 7.75 kg/mm² |
| Deflection (according to VSM 77,103) | | = 12.9 mm |
| Impact strength (according to VSM 77,105) | | = 8.07 cm.kg/cm² |
| Water absorption (4 days at 20°C) | | = 0.17 % |
| Dimensional stability (according to DIN 53,461) | | = 57°C |
| Inflammability (CTM/20a) (burning time: 1 second) | | = grade 1 |

EXAMPLE IV 100 g of the polyester-styrene mixture prepared in accordance with Example 2 are processed in accordance with Example I, only half of each of the cobalt naphthenate and methyl ethyl ketone hydroperoxide solution used there being employed, however. The mixture polymerises completely in about 6 hours at room temperature to give a solid moulded article, which is removed from the mould after 24 hours. It has the following characteristics:

phthalate) at room temperature, subjected to vacuum treatment for a short time in order to remove air bubbles and cast into aluminium moulds. The polyester resin mixture is practically completely cured after 2 – 3 hours at room temperature. The test specimens, which are suitable for carrying out the test of inflammability, are released from the mould.

Inflammability (according to CTM 20a): grade 1 (burning time: 1 second)

This polyester resin solution prepared in accordance with U.S. Pat. No. 2,779,701, Example 1), is so highly

| Dielectric loss factor | tan δ (50 Hz) | |
|---|---|---|
| | at 23°C | = 0.020 |
| | at 100°C | = 0.039 |
| Dielectric constant ε | at 23°C | = 4.2 |
| Specific volume resistivity | at 23°C | = 9.6 × 10$^4$ Ω .cm |
| Flexural strength (according to VSM 77,103) | | = 5.83 kg/mm$^2$ |
| (no fracture at maximum deflection) | | |
| & Deflection (according to VSM 77,103) | | = > 20.0 mm |
| Impact strength (according to VSM 77,105) | | = 10.3–14.3 cm.kg/cm$^2$ |
| Tensile strength (according to VSM 77,101) | | = 3.2 kg/mm$^2$ |
| Elongation at break (according to VSM 77,101) | | = 18% |
| Inflammability (according to CTM/20a) | | = grade 1 |
| | | (burning time: 2 seconds) |

Comparison Example IA 100 parts by weight of the styreneated polyester prepared in accordance with Comparison Example A are processed in exact accordance with Example I.

This gives clear moulded articles which, in contrast with the above examples, burn very readily and with a very smoky flame and which, in other respects, possess the following properties:

viscous that it is only possible to cast bars for the inflammability test, but not 4 mm or 2 mm sheets, so that standardised mechanical tests cannot be carried out.

A comparison with Application Example I shows that the polyesters, according to the invention, containing the tetrabromobenzimidazolone derivative, which has a better fireproofing effect, can be more highly diluted with styrene, whereby better processability is achieved, and that the cured products obtained from the polyes-

| Flexural strength (according to VSM 77,103) | = 6.72 kg/mm$^2$ |
|---|---|
| Deflection (according to VSM 77,103) | = 10.3 mm |
| Dimensional stability (according to DIN 53,461) | = 57°C |
| Inflammability (according to CTM/20a) | = grade 0 |
| (burning time: > 60 seconds) | |

The comparison shows that the flame-retarding polyesters according to the invention are at least mechanically equivalent to the commercially available product, which is not non-inflammable.

Comparison Example IIB a. 100 g of the comparison polyester solution B$_1$ prepared in Comparison Example B are intimately mixed with 0.5 g of 8% strength cobalt naphthenate and 1.5 g of cyclohexanone hydroperoxide (in dimethyl ter resin solutions, according to the invention, of lower viscosity, are at least equivalent in respect of their flame-retarding properties.

b. 100 parts of the comparison polyester solution B$_2$, prepared in Comparison Example B, are cured exactly as given above under a). This gives moulded articles having the following properties;

| Inflammability (according to CTM 20a) | grade 1 (burning time) 1 second) |
|---|---|
| Flexural strength (according to VSM 77,103) | 8.56 kg/mm$^2$ |
| Deflection (according to VSM 77,103) | 3.6 mm |
| Water absorption (1 hour/100°C) | 0.84%. | c. 100 parts of the comparison polyester solution B$_3$, prepared in Comparison Example B, are cured as in Application Example I to give moulded articles having the following properties:

| Inflammability (according to CTM 20a) | grade 1 (burning time 1 second) |
|---|---|
| Flexural strength (according to VSM 77,103) | 6.90 kg/mm$^2$ |
| Deflection (according to VSM 77,103) | 3.40 mm |
| Impact strength (according to VSM 77,105) | 3.18 cm.kg/cm$^2$ |
| Water absorption (1 day/100°C) | 0.32% |
| Dimensional stability (according to DIN 53,461) | 50.0°C |
| Dielectric constant ε at 23°C | = 3.5 |

Dielectric loss factor
at 100° C = 4.7
at 130° C = 5.7
tan δ (50 Hz)
at 23° C = 0.012
at 100° C = 0.065
at 130° C = 0.13
Specific volume resistivity (according to DIN 53,482)
at 23° C = 7.3 . 10¹⁵ Ω .cm
at 100° C = 6.9 . 10¹¹ Ω .cm From a comparison of the moulded articles obtained in accordance with Example c with the moulded articles having the same styrene content, according to Application Example I, it can be seen that the moulded articles prepared from the polyesters according to the invention have both better flame-retardation and better mechanical properties. The moulded articles prepared from the polyesters according to the invention are also characterised by better heat stability, as can be seen from a comparison of the electrical propertites of the moulded articles at elevated temperature.

What we claim is:

1. An unsaturated, flame-retardant, linear polyester consisting essentially in the total condensed acid component of at least 20 mol % of an unsaturated dicarboxylic acid selected from the group consisting of maleic, fumaric, itaconic, citraconic and dimethylmaleic acids and up to 80 mol % of a saturated aromatic or aliphatic dicarboxylic acid selected from the group consisting of phthalic, terephthalic, isophthalic, 2,5-dibromoterephthalic, succinic, glutaric, adipic, pimelic, suberic, azelaic and sebacic acids; and in the total condensed diol component of at least 18 mol % of a brominated or of at least 47 mol % of a chlorinated benzimidazolone diol of formula I

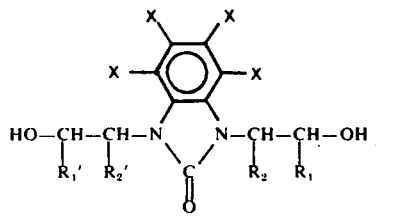

(I)

wherein X independently denotes bromine or chlorine, $R_1$ and $R_1'$ each denotes hydrogen, methyl, ethyl or phenyl, and $R_2$ and $R_2'$ each denotes hydrogen or $R_1$ together with $R_2$ and $R_1'$ together with $R_2'$ each denote trimethylene or tetramethylene; the amount of diol of formula I incorporated in said polyester being that required to bring the bromine content of said polyester to at least 15 weight % or the chlorine content to at least 20 weight %; and with the remaining condensed diol component selected from the group consisting of ethylene glycol, diethylene glycol, polyethylene glycol of up to 24 carbon atoms, propylene glycol, dipropylene glycol, polypropylene glycol of up to 24 carbon atoms, 1,4-butanediol, 1,12-dodecanediol, neopentyl glycol and 1,4-cyclohexanediol.

2. A polyester according to claim 1 wherein the acid components consist of at least 50 mol % of unsaturated dicarboxylic acid radicals.

3. A polyester according to claim 1 containing a benzimidazolone diol of formula I wherein X is bromine or chlorine, $R_1$ and $R_1'$ each denote hydrogen or methyl, and $R_2$ and $R_2'$ each denote hydrogen.

4. A polyester according to claim 1 consisting essentially in the total condensed acid component of at least 50 mol % of an unsaturated acid selected from the group consisting of maleic acid or fumaric acid, and up to 50 mol % of a saturated aromatic or aliphatic acid selected from the group consisting of phthalic acid, adipic acid, glutaric acid and sebacic acid; and in the total condensed diol component of at least 18 mol % of a brominated or of at least 47 mol % of a chlorinated benzimidazolone diol of formula I wherein X is bromine or chlorine, $R_1$ and $R_1'$ each denote hydrogen or methyl, and $R_2$ and $R_2'$ each denote hydrogen; and with the remaining condensed diol component selected from the group consisting of ethylene glycol and diethylene glycol.

* * * * *